United States Patent
Patwardhan et al.

(10) Patent No.: US 12,182,003 B1
(45) Date of Patent: Dec. 31, 2024

(54) HARDWARE SUPPORT FOR SOFTWARE EVENT COLLECTION

(71) Applicant: Apple Inc., Cupertino, CA (US)

(72) Inventors: Jaidev P. Patwardhan, Mountain View, CA (US); Matthias Knoth, Scotts Valley, CA (US); Shekhar S. Srikantaiah, San Ramon, CA (US); Prakhar Malhotra, San Jose, CA (US); Matthew C. Widmann, Cupertino, CA (US); Dmitriy B. Solomonov, Sunnyvale, CA (US); Constantin Pistol, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 328 days.

(21) Appl. No.: 17/647,539

(22) Filed: Jan. 10, 2022

Related U.S. Application Data

(60) Provisional application No. 63/239,347, filed on Aug. 31, 2021.

(51) Int. Cl.
    G06F 11/36 (2006.01)
    G06F 11/07 (2006.01)
(52) U.S. Cl.
    CPC ...... *G06F 11/3636* (2013.01); *G06F 11/0757* (2013.01); *G06F 11/0772* (2013.01); *G06F 11/3656* (2013.01); *G06F 11/3664* (2013.01)
(58) Field of Classification Search
    None
    See application file for complete search history.

(56) References Cited

U.S. PATENT DOCUMENTS

| | | | | |
|---|---|---|---|---|
| 5,651,125 A | * | 7/1997 | Witt | G06F 9/30025 712/E9.055 |
| 6,145,123 A | * | 11/2000 | Torrey | G06F 11/3648 714/45 |
| 6,523,136 B1 | * | 2/2003 | Higashida | G06F 11/3648 714/E11.215 |
| 7,080,283 B1 | * | 7/2006 | Songer | G06F 11/3636 714/30 |

(Continued)

OTHER PUBLICATIONS

C. Hochberger and A. Weiss, "Acquiring an exhaustive, continuous and real-time trace from SoCs," 2008 IEEE International Conference on Computer Design, Lake Tahoe, CA, USA, 2008, pp. 356-362. (Year: 2008).*

(Continued)

*Primary Examiner* — Andrew M. Lyons
(74) *Attorney, Agent, or Firm* — Kowert, Hood, Munyon, Rankin & Goetzel, P.C.; Scott W. Pape; Dean M. Munyon

(57) ABSTRACT

An apparatus includes a processor circuit that includes a memory circuit, one or more processor cores, and a debug circuit. The debug circuit may be configured, in response to activation of a trace mode to record information indicative of instructions executing on the one or more processor cores, to write a trace data stream to the memory circuit that includes trace data collected on the instructions executing on the one or more processor cores. In response to a particular instruction within one of the processor cores specifying a write of a data value to an architecturally visible trace register, the debug circuit may be further configured to output the data value to the trace data stream as part of executing the particular instruction.

20 Claims, 10 Drawing Sheets

(56) References Cited

U.S. PATENT DOCUMENTS

| | | | |
|---|---|---|---|
| 7,080,289 B2* | 7/2006 | Swaine | G06F 11/348 |
| | | | 714/45 |
| 7,610,517 B2 | 10/2009 | Alsup | |
| 9,377,507 B2 | 6/2016 | Kilzer et al. | |
| 10,579,499 B2 | 3/2020 | Engler et al. | |
| 10,896,110 B2 | 1/2021 | Engler et al. | |
| 2002/0010882 A1* | 1/2002 | Yamashita | G06F 11/3648 |
| | | | 714/E11.212 |
| 2006/0069952 A1* | 3/2006 | Peled | G06F 11/348 |
| | | | 714/25 |
| 2006/0117224 A1* | 6/2006 | Wu | G06F 11/273 |
| | | | 714/E11.166 |
| 2006/0117229 A1* | 6/2006 | Swaine | G06F 11/348 |
| | | | 714/45 |
| 2008/0040587 A1* | 2/2008 | Burke | G06F 11/3648 |
| | | | 714/E11.208 |
| 2008/0126877 A1* | 5/2008 | Alsup | G06F 11/3636 |
| | | | 714/E11.178 |
| 2011/0289357 A1* | 11/2011 | Shiina | G06F 11/3636 |
| | | | 714/E11.212 |
| 2012/0216080 A1* | 8/2012 | Bansal | G06F 11/348 |
| | | | 714/45 |

OTHER PUBLICATIONS

A. B. T. Hopkins and K. D. McDonald-Maier, "Debug support strategy for systems-on-chips with multiple processor cores," in IEEE Transactions on Computers, vol. 55, No. 2, pp. 174-184, Feb. 2006. (Year: 2006).*

* cited by examiner

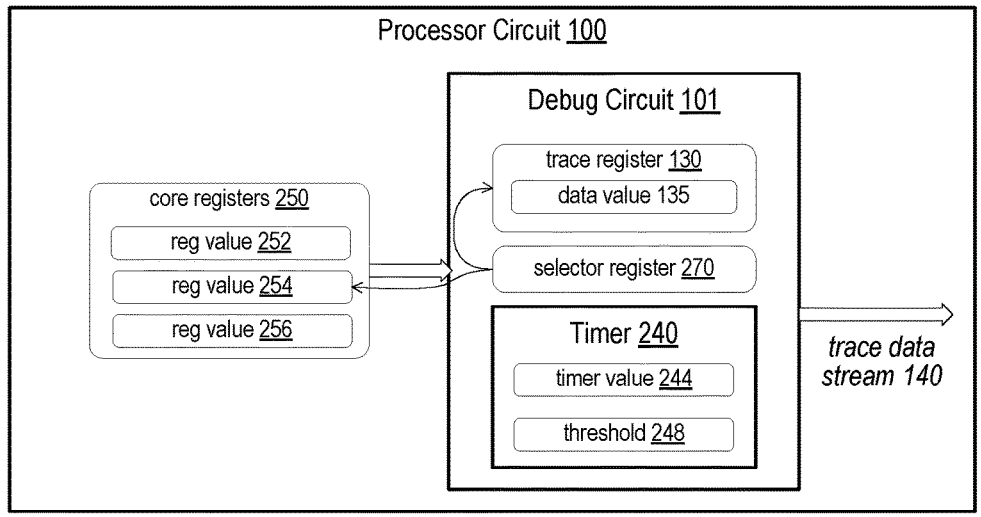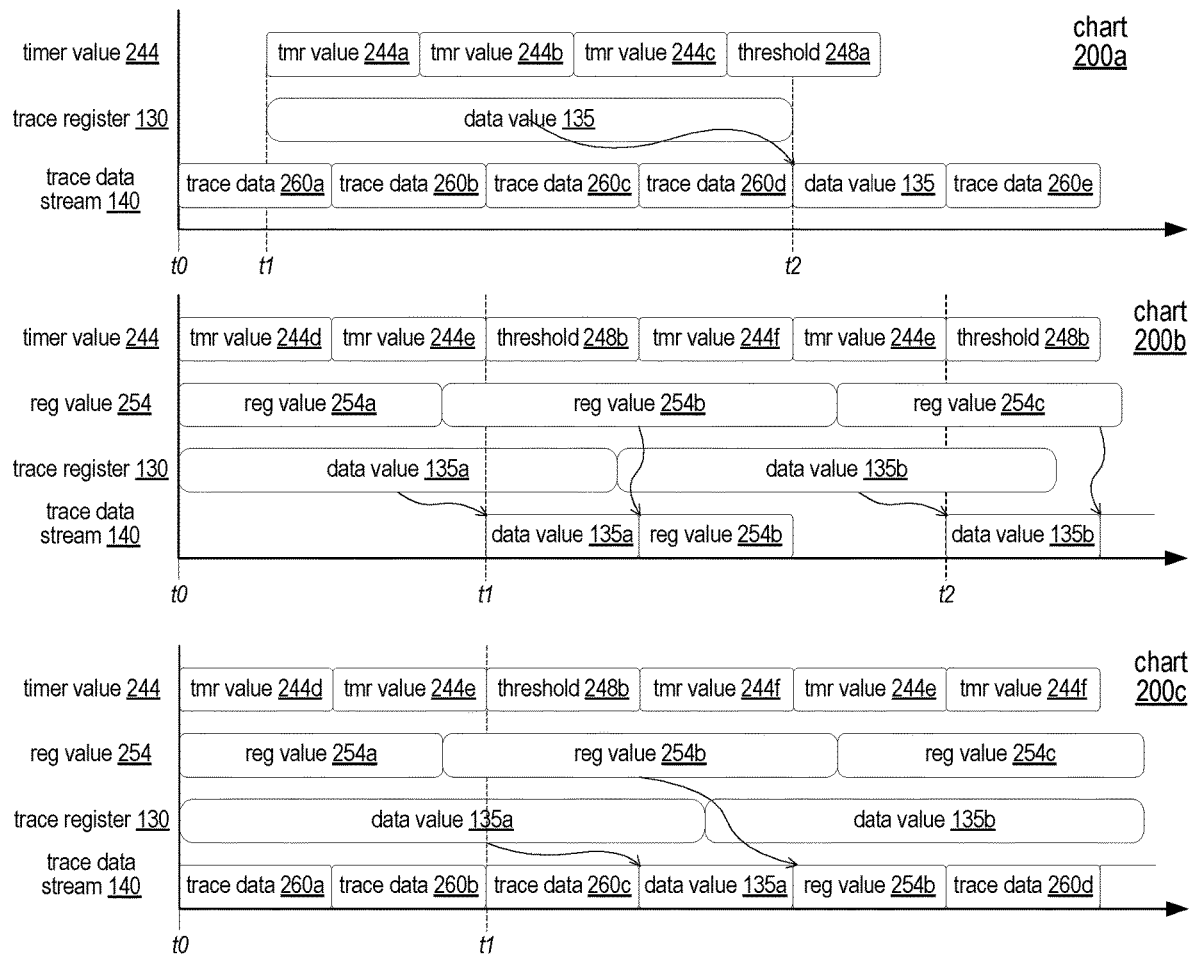
FIG. 2

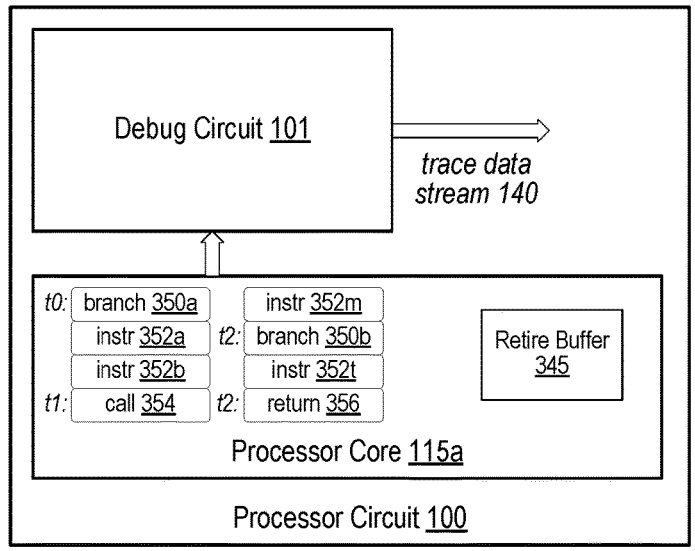
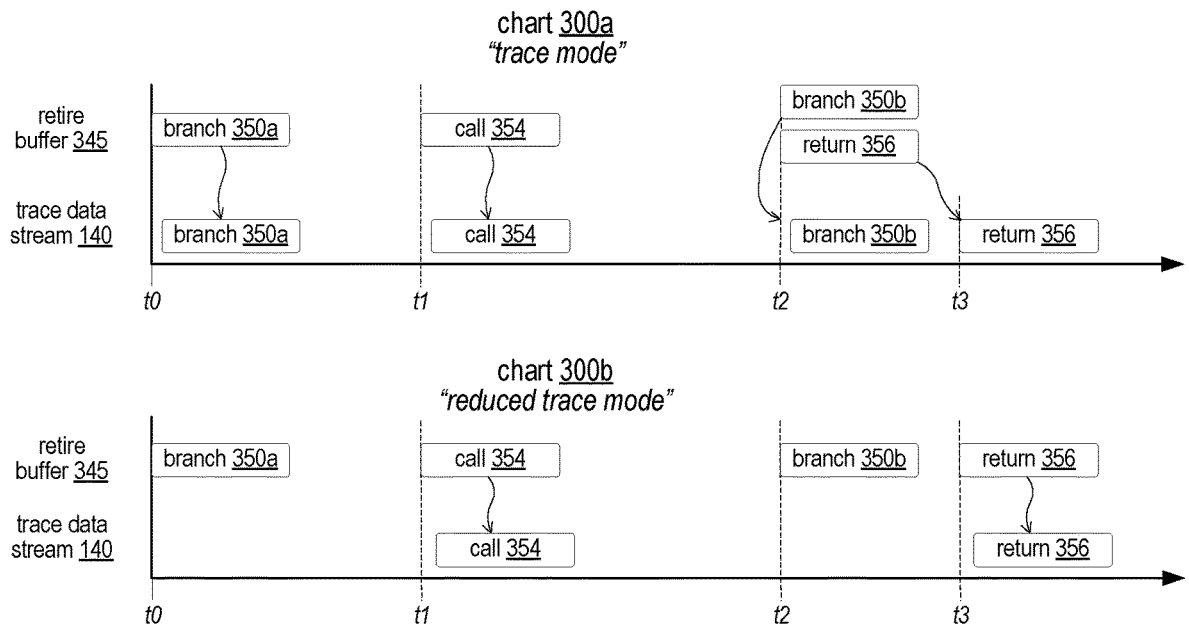
FIG. 3

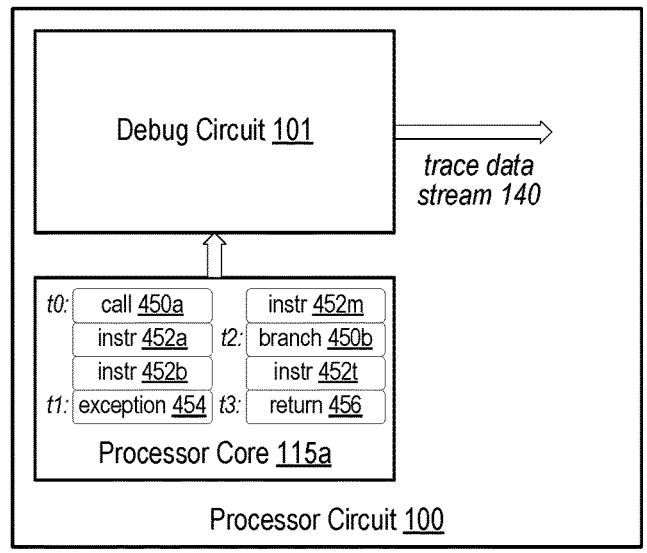
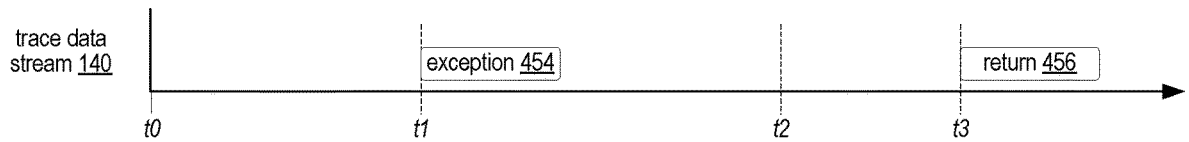
FIG. 4

600

In response to an activation of a trace mode to record information associated with a program executing on a processor core, generating, by a debug circuit, a trace data stream that includes trace data collected on the executing program.
610

Executing, by the processor core, a particular instruction in the program that specifies a write of a data value to an architecturally-specified trace register in the debug circuit.
620

Annotating, by the debug circuit, the trace data stream with the data value from the trace register as part of executing the particular instruction.
630

```
┌─────────────────────────────────────────────┐
│ Activating a register trace mode to record  │
│   values of a particular set of core        │
│             registers.                      │
│                  710                        │
└─────────────────────────────────────────────┘
                     ↓
┌─────────────────────────────────────────────┐
│ Determining, by the debug circuit, the      │
│ particular set of registers using a value   │
│     of a programmable selector register.    │
│                  720                        │
└─────────────────────────────────────────────┘
                     ↓
┌─────────────────────────────────────────────┐
│ In response to determining that a           │
│ particular period of time has elapsed,      │
│ stalling, by the debug circuit, a program   │
│       executing on the processor core.      │
│                  730                        │
└─────────────────────────────────────────────┘
                     ↓
┌─────────────────────────────────────────────┐
│ Annotating, by the debug circuit, the trace │
│ data stream with respective data values     │
│ from the particular set of core registers   │
│ by inserting the respective data values     │
│ into the trace data stream during the       │
│ stalling.                                   │
│                  740                        │
└─────────────────────────────────────────────┘
```

```
┌─────────────────────────────────────────────────────────┐
│ In response to an activation of a low bandwidth trace   │
│ mode, to cause the processor cores to retire a maximum  │
│ of one branch instruction per clock cycle.              │
│                         810                             │
└─────────────────────────────────────────────────────────┘
                            │
                            ▼
┌─────────────────────────────────────────────────────────┐
│ Output, into the trace data stream, information         │
│ indicative of execution of call instructions and return │
│ instructions by the one or more processor cores, and    │
│ ignore information indicative of other instructions     │
│ executed by the one or more processor cores             │
│                         820                             │
└─────────────────────────────────────────────────────────┘
                            │
                            ▼
┌─────────────────────────────────────────────────────────┐
│ Output, into the trace data stream, information         │
│ indicative of an occurrence of an exception.            │
│                         830                             │
└─────────────────────────────────────────────────────────┘
```

FIG. 8

HARDWARE SUPPORT FOR SOFTWARE EVENT COLLECTION

PRIORITY CLAIM

This application claims the benefit of U.S. Provisional Patent Application No. 63/239,347, filed on Aug. 31, 2021, and whose disclosure is incorporated herein by reference.

BACKGROUND

Technical Field

Embodiments described herein are related to systems-on-a-chip (SoCs) and, more particularly, to methods for tracing program execution flow.

Description of the Related Art

A software program executing on a computer system may include various branching instructions. Input received by the computer system may impact when particular branch instructions take a branch or continue executing without branching. In order to observe a flow of program execution, hardware and software developers may utilize a debug trace mode available in the computer system. Such debug trace modes may enable developers to investigate unexpected behavior of hardware and/or software of the computer system, evaluate hardware changes to the computer system, evaluate new and/or revised software programs, and the like.

When a trace mode is enabled in a computer system, particular debug circuits may observe activity on one or more processor buses coupled to corresponding processor cores. Values observed on the processor buses may be sent to a debugger that includes respective debug hardware and/or software that executes on the computer system or in a separate debugger system coupled to the computer system. The debugger may then use the received data to determine which instructions and associated data are being executed at a given time, and provide this information to the developer.

SUMMARY

In an embodiment, an apparatus includes a processor circuit that includes a memory circuit, one or more processor cores, and a debug circuit. The debug circuit may be configured, in response to activation of a trace mode to record information indicative of instructions executing on the one or more processor cores, to write a trace data stream to the memory circuit that includes trace data collected on the instructions executing on the one or more processor cores. In response to a particular instruction within one of the processor cores specifying a write of a data value to an architecturally visible trace register, the debug circuit may be further configured to output the data value to the trace data stream as part of executing the particular instruction.

In a further example, the debug circuit may be further configured, based on the write to the trace register, to initiate a timer, and to attempt to locate an idle cycle in the trace data stream to output the data value from the trace register. In response to a determination that the timer has reached a threshold value and the idle cycle has not occurred, the debug circuit may be configured to stall the programs executing on the one or more processor cores, and to output the data value from the trace register into the trace data stream.

In another example, the debug circuit may be further configured to output a current data value of the trace register in response to a determination that a particular period of time has elapsed since a previous output of the data value. In an example, the debug circuit may be further configured to output respective current data values of particular core registers with the current data value of the trace register.

In another embodiment, the debug circuit may be further configured to cease output of the trace data collected on the programs executing on the one or more processor cores while maintaining periodic output of the current data values of the trace register and the particular core registers. In an embodiment, the one or more processor cores may be further configured to write the data value to the trace register in a single cycle of a system clock signal.

In a further example, the debug circuit may be further configured to output trace data corresponding to call instructions and return instructions executed by the one or more processor cores. The debug circuit may also be configured to omit trace data corresponding to other instructions executed by the one or more processor cores.

BRIEF DESCRIPTION OF THE DRAWINGS

The following detailed description makes reference to the accompanying drawings, which are now briefly described.

FIG. 2 shows a block diagram of an embodiment of the system of FIG. 1 as well as three charts depicting a trace data stream in two different trace modes.

FIG. 3 depicts a block diagram of another embodiment of the system of FIG. 1 as well as two additional charts depicting a trace data stream in two different trace modes.

FIG. 4 illustrates a block diagram of another embodiment of the system of FIG. 1 as well as a chart depicting a trace data stream resulting from an exception.

FIG. 6 depicts a flow diagram of an embodiment of a method for annotating a trace data stream with a value from a trace register.

FIG. 7 illustrates a flow diagram of an embodiment of a method for annotating a trace data stream with values periodically read from a set of core registers.

FIG. 8 shows a flow diagram of an embodiment of a method for operating a low-bandwidth trace mode.

Figure 1:
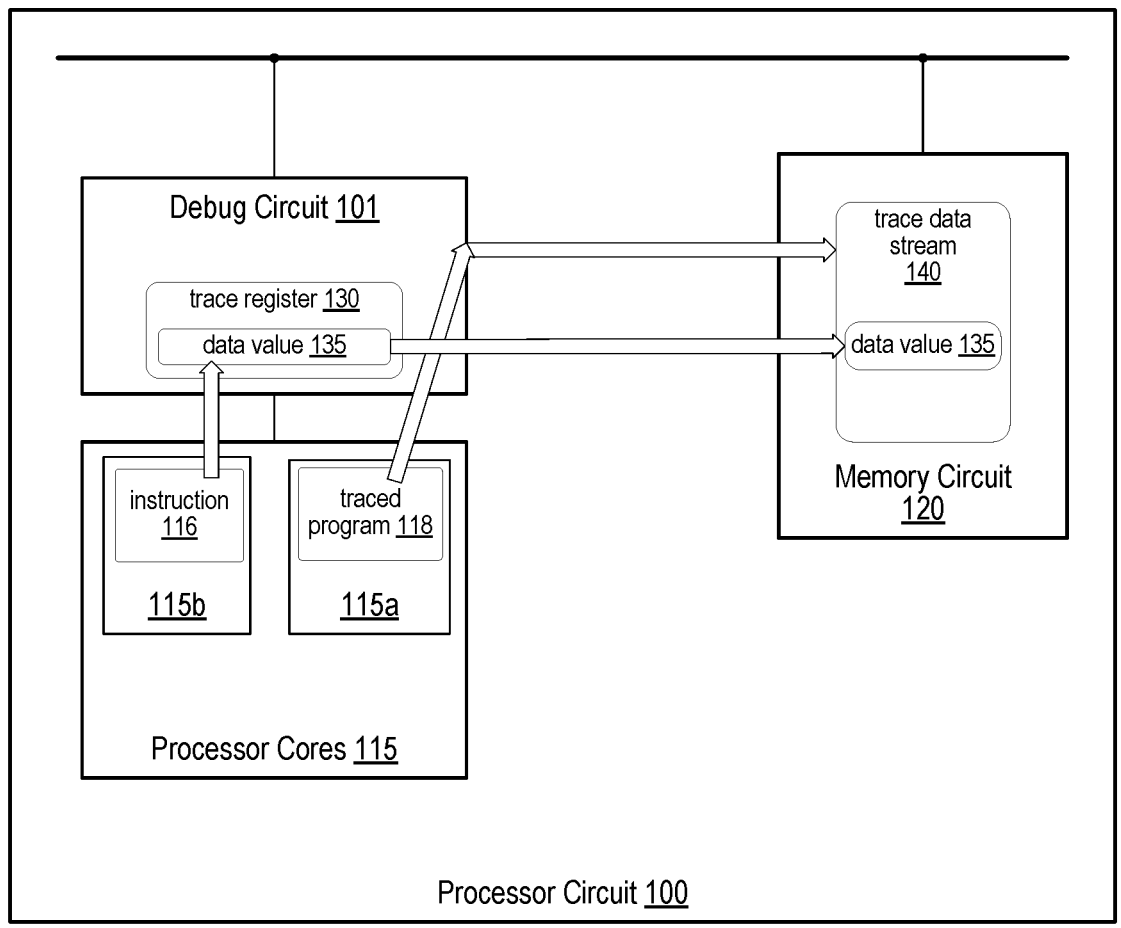
FIG. 1 illustrates a block diagram of an embodiment of a system that includes a debug circuit with a trace register.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

As stated, when a trace mode is enabled in a computer system, particular debug circuits may observe activity on one or more processor buses coupled to corresponding processor cores. This observed activity includes operations performed in response to instructions executed by one or more processor cores in the computer system. A debugger system used to enable the trace mode in the computer system may have access to programs being executed by the computer system. For example, a developer that is performing a debugging session on the computer system may load the debugger system with the same program code that is being run on the computer system. To perform a trace of the flow of the program code, the debugger system may not require information on all instructions executed in the program, but rather just instructions that determine the flow of the program through various software loops and subroutines that are typically used in programs. Accordingly, to reduce an amount of trace data to be sent from the debug circuits in the computer system to the debugger system, some debugger systems may limit the trace data to information indicative of the execution of various types of branch instructions. Between each executed branch instruction, the debugger system may be capable of determining the program flow using the loaded program code. The debugger system may only need to know when the program flow deviates from a linear sequence of instructions.

By limiting the trace data in such a manner, the amount of information that is traced may be reduced, thereby requiring less bandwidth from the computer system to record trace information. The reduced amount of trace information recorded, however, may increase a difficulty for inserting debug messages into the software program. For example, the developer may wish to output a message, or a current value of a particular variable at certain points in the program such that the message or value is inserted into the trace stream. Such additional information may help the developer to understand a software/hardware bug or determine an opportunity for an improvement to the software and/or hardware. If only information for particular instructions is being traced, then inserting the desired content into the trace stream may require inserting the desired content by use of instructions that would trigger the debug circuits to trace the inserted content. Such a method for inserting content could disrupt the normal execution flow of the program, thereby making the captured trace information a less reliable depiction of actual program operation.

The present disclosure considers a novel digital circuit that inserts a data value written to a trace register. This trace register may be used to allow a software program to annotate a trace stream with various messages. These messages may be inserted into the trace stream with little to no disruption in the program flow, thereby producing more accurate trace results. In addition, the novel digital circuit may include a mechanism for inserting values for other registers in the one or more processor cores that execute the instructions of the program. Such a core register "dump" may provide a developer with additional information that may be used to identify unexpected behavior and/or determine opportunities for program and/or hardware improvement.

The novel digital circuit may further include a mechanism for a low-bandwidth trace mode. As disclosed above, a normal trace mode may record information for all executed instructions that cause a deviation from a linear sequence of program instructions. Such instructions include a variety of branch instructions and may capture all deviations from the linear sequence. Simply having program information that indicates when a program calls a subroutine or returns from a called subroutine may provide adequate information, in some cases. A low-bandwidth trace mode is contemplated in which traced instructions are limited to subroutine call and return instructions, thereby providing indications of software subroutine executions. Such a low-bandwidth trace mode may provide an adequate amount of trace data while also reducing an impact to program execution. For example, a given software bug may be related to timing between execution of two different instructions. A full debug trace mode may inject sufficient delays into the program execution such that the timing between the execution of the two instructions is lengthened and the given bug does not occur. The low-bandwidth trace mode may inject fewer delays such that the given bug is visible, and the trace information may provide sufficient data to identify a cause for the given bug. This low-bandwidth trace mode may further provide a default mechanism to enable in the event of improper operation of the computer system. For example, the low-bandwidth trace mode may be automatically enabled if particular exceptions are detected, such as use of an illegal address or illegal instruction, potentially enabling capture of data related to the particular exception.

The disclosed embodiments describe systems and methods for tracing memory requests sent to a cache memory circuit. The disclosed techniques may improve an ability to capture information in a trace data stream for reconstructing a program flow while reducing an impact to the program execution. For example, an embodiment may include a debug circuit that includes a trace register that can be written by a processor core. When active, the debug circuit writes trace data associated with the processor core to a trace data stream captured in a memory circuit. In response to detecting a write to the trace register, the debug circuit looks for a pause in the trace data stream to copy contents of the trace register into the trace data stream.

FIG. 1 illustrates a block diagram of one embodiment of a processor circuit with a debug circuit that includes a trace register for annotating a trace data stream. As illustrated, processor circuit 100 includes debug circuit 101, memory circuit 120 and processor cores 115. Debug circuit 101 includes trace register 130.

As illustrated, processor cores 115 correspond to any suitable type of processing circuit. For example, processor cores 115 may be multiple instances of a same processor core design in a multicore processor. In other embodiments, processor cores 115 may be part of a heterogenous processing complex in which at least one of processor cores 115 differs from the others. In some embodiments, processor cores 115 may correspond to a general-purpose processor core and a plurality of co-processor circuits, such as a floating-point processor, graphics processor, encryption engine, and the like. Memory circuit 120, as shown, includes memory cells and related circuitry for receiving and storing trace data stream 140.

As shown, debug circuit 101 is configured, in response to activation of a trace mode to record information indicative of instructions executing on one or more of processor cores 115, to write trace data stream 140 to memory circuit 120. Trace data stream 140 may include trace data collected on instructions executing on processor core 115*a* for traced program 118. For example, a debugger circuit may be coupled to processor circuit 100, and a developer or other user of the debugger system may cause an activation of a debug mode signal (e.g., in debug circuit 101) that causes processor circuit 100 to enter the trace mode. While this trace mode is active, debug circuit 101 may be configured to observe a processor bus, or other interface coupled to processor cores 115, to detect execution of instructions that are indicative of a flow of traced program 118 executing on processor core 115*a*. In some embodiments, the debugger system may provide an indication to debug circuit 101 which ones of processor cores 115 to monitor. In other embodiments, debug circuit 101 may be configured to determine which ones of processor cores 115 are executing instructions corresponding to traced program 118.

In response to instruction 116 within processor core 115b specifying a write of data value 135 to an architecturally visible trace register 130, debug circuit 101 is further configured to output data value 135 to trace data stream 140 as part of executing instruction 116. Processor core 115b may be included in processor cores 115 that are being monitored by debug circuit 101 or may be executing instructions for a different program than traced program 118. For example, traced program 118 may include instruction 116 to add a message to trace data stream 140 such that a particular line of code in traced program 118 may be synchronized to trace data stream 140. In a different example, processor core 115b may not be associated with the execution of traced program 118 and, therefore, may not be monitored by debug circuit 101. Instead, processor core 115b may be executing instructions for a software kernel or other type of background process that is executed concurrently with traced program 118. Processor core 115b may be configured (e.g., by the program it is executing) to execute instruction 116 in response to a particular event in processor circuit 100, such as, an access by processor core 115a to a particular address or within a range of addresses, a counter or timer satisfying a threshold value, or other similar event.

As illustrated, the write of data value 135 to trace register 130 may be performed without altering an architectural state of processor cores 115. Trace register 130 may be "architecturally visible" which, as used herein, refers to a register that is included in the processor's register map. A processor may be capable of executing an instruction to address a write command to an architecturally visible register. An architecturally visible register, in various embodiments, may, or may, not be implemented as a storage circuit. For example, an architecturally visible register may include circuitry for receiving a value which, in turn, causes a particular response based on the value. In regards to trace register 130, the response is to annotate trace data stream 140 with a written data value 135. Trace register 130 may not, in some embodiments, include circuits for storing a received data value 135. Instead, a write to the architecturally visible trace register 130 may cause data value 135, included in the write instruction, to be queued for insertion into trace data stream 140. In other embodiments, trace register 130 is both architecturally visible, as well as capable of storing a received data value 135.

Use of such an architecturally visible register may allow for data value 135 to be written without changing an architectural state of processor cores 115. As used herein, an "architectural state" refers to current values in various processor core registers after execution of an instruction. In a typical processor core, execution of at least a subset of valid instructions may result in a change to one or more of these core registers, such as a condition code register, a status register, and the like, thereby resulting in a change to the architectural state. For example, a write instruction may typically cause a condition code register to update one or more bits, such as a negative bit that indicates if the written value was a negative number, and/or a zero bit that indicates if the written bit was equal to zero. While recording trace data, it may be undesirable to modify an architectural state of processors being traced in response to a write to trace register 130. Trace data stream 140 may be desired to accurately depict operation of traced program 118 when trace program 118 is not being traced. Modifying an architectural state of processor cores 115 to annotate trace data stream 140 may cause trace data stream 140 to record information that would have been different if the trace mode was inactive (that is, the act of tracing may perturb underlying architectural state, which may introduce undesired artifacts that would not occur during non-trace operation). If the architectural state of processor cores 115 is changed, then the debugger system may have to perform additional processing of received trace data stream 140 in order to compensate for changes caused by debug operations. This may lead to delayed debugger operations and/or to an inaccurate reconstruction of the trace program flow.

In some embodiments, processor core 115b is configured to write data value 135 to trace register 130 in a single cycle of a system clock signal. In addition to a desire to avoid changing an architectural state of processor cores 115 when writing trace register 130, it may be desirable to perform the write using few clock cycles. Performing the write to trace register 130 in a single clock cycle may reduce a timing impact to the flow of traced program 118. As stated above, in some cases, an additional delay introduced into the program flow due to use of the trace mode may result in the program flow being different during the trace mode than when the trace mode is inactive. Accordingly, limiting the delay to a single cycle may, in some embodiments, be an acceptable tradeoff between accuracy of the trace and an amount of information that can be placed into trace data stream 140.

As shown, debug circuit 101 is further configured to insert data value 135 from trace register 130 into trace data stream 140 as part of the execution of instruction 116. Debug circuit 101 may be further configured to locate an idle cycle in trace data stream 140 to output data value 135. In some embodiments, a sole purpose of the execution of instruction 116 is to insert data value 135 into trace data stream 140. The actual value of data value 135 may have no impact to the flow or operation of traced program 118. Instruction 116 may be executed solely for the purpose of inserting additional debug information into trace data stream 140.

Use of a trace register to insert additional information into a trace data stream may allow for additional debugging capabilities with little to no impact to the program flow during the trace operation. Such additional information may be useful to a developer or other user of a debugger system receiving the recorded trace information to identify particular portions of code that may be associated with a hardware or software bug, and/or to determine opportunities to optimize or improve the hardware and/or software.

It is noted that processor circuit 100, as illustrated in FIG. 1, is merely an example. The illustration of FIG. 1 has been simplified to highlight features relevant to this disclosure. Various embodiments may include different configurations of the circuit elements. For example, memory circuit 120 is depicted as being included within processor circuit 100. In other embodiments, memory circuit 120 may be partially or entirely implemented external to processor circuit 100. Although two processor cores 115 are shown, any suitable number of processor cores may be included in other embodiments.

In regards to processor circuit 100 illustrated in FIG. 1, a trace data stream is disclosed into which a data value from a trace register is inserted by a debug circuit. Debug circuits may be implemented, and may operate, in various fashions. Examples of operation of a debug circuit are shown in FIG. 2.

Moving to FIG. 2, a block diagram of an embodiment of the processor circuit from FIG. 1, further including a timer and multiple core registers is shown. In addition, three charts are illustrated depicting a flow of information to a trace data stream. Processor circuit 100, as shown, includes debug circuit 101 and core registers 250. Debug circuit 101 includes trace register 130, timer 240, and selector register 270. Charts 200a, 200b, and 200c depict three examples of trace modes that may be supported by debug circuit 101.

As shown, chart 200a illustrates an example of how debug circuit 101 may annotate trace data stream 140 while a series of trace data 260a-260e is being output. In response to a write of data value 135 to trace register 130, debug circuit 101 may be further configured to attempt to locate an idle cycle in trace data stream 140 to insert data value 135 from trace register 130. As a part of this attempt, debug circuit 101 may be further configured to, based on the write to trace register 130 at time t1, initiate timer 240. Threshold 248a may be selected to indicate a particular period of time for debug circuit 101 to wait for an idle cycle. The period of time may be programmable and may be based on a maximum acceptable delay between a write to trace register 130 and data value 135 being output into trace data stream 140. Timer 240 is configured to increment timer value 244 (e.g., timer values 244a, 244b, 244c) while debug circuit 101 attempts to locate an idle cycle in trace data stream 140.

In response to a determination that timer value 244 has reached threshold 248 and that an idle cycle has not occurred, debug circuit 101 is further configured to stall programs executing on the one or more processor cores 115 in FIG. 1. As shown, trace data 260a, 260b, 260c and 260d are output to trace data stream 140 without an idle cycle. When timer value 244 reaches threshold 248a, debug circuit 101 may activate a stall of one or more of processor cores 115 that are contributing to trace data stream 140. In response to the stall, any instructions in the stalled processor may be allowed to complete and one or more trace data values (e.g., trace data 260d) may be output before an idle cycle appears in trace data stream 140 at time t2. In response to the idle cycle occurring after the stall, debug circuit 101 is configured to output data value 135 from trace register 130 into trace data stream 140. After outputting data value 135, debug circuit 101 may be configured to deactivate the stall, thereby allowing processor cores 115 to resume program execution. Output of trace data values (e.g., trace data 260e) may resume after data value 135 has been output.

As illustrated, chart 200b illustrates an example of an architectural trace mode. In this architectural trace mode, debug circuit 101 is further configured to output a current data value 135 of trace register 130 in response to a determination that a particular period of time has elapsed since a previous output of data value 135. Threshold 248 in timer 240 is set to threshold 248b, which may correspond to a same or different period of time than threshold 248a. At time t1 of chart 200b, timer value 244 reaches threshold 248, at which point, trace register 130 has data value 135a. Debug circuit 101 outputs data value 135a from trace register 130 to trace data stream 140.

In the architectural trace mode, debug circuit 101 may be further configured to output respective current data values of a particular set of core registers 250 along with a current data value 135 of trace register 130. As shown in chart 200b, register value 254 is selected to be output along with trace register 130. Debug circuit 101 is configured to select the particular set of core registers 250 using a value of programmable selector register 270. Selector register 270 may include a plurality of programmable bits, a particular bit corresponding to a respective one of core registers 250. In some embodiments, trace register 130 may also have a corresponding bit such that it can be included in, or excluded from, the set of core registers to be traced.

Debug circuit 101 may be further configured to optionally cease output of the trace data 260 collected on the programs executing on the one or more processor cores 115 while maintaining periodic output of the current data values 135 of trace register 130 and selected register value 254. The architectural trace mode may be enabled while trace data collection is disabled, allowing for register information to be recorded without additional trace data. This may allow a developer to focus on architectural states of processor circuit 100 at time in which program flow information may not be a concern. In the example of chart 200b, trace data collection is disabled and no values of trace data 260 are output to trace data stream 140. Accordingly, at times t1 and t2, the current data value 135 and register value 254 are output after timer value 244 reaches threshold 248b, with little to no delay.

As disclosed, the particular period of time is determined based on a value of threshold 248 in timer 240. Debug circuit 101 may be further configured to deactivate the architectural trace mode in response to a determination that the particular period of time is less than a minimum allowable period of time. For example, threshold 248b may be set by a user of a debugger system coupled to processor circuit 100. If a period of time represented by threshold 248b is less than the minimum allowable period of time, then debug circuit 101 may deactivate the architectural trace mode. In other embodiments, debug circuit 101 may reset threshold 248b to a value corresponding to the minimum allowable period of time rather than deactivating the mode. In some embodiments, debug circuit 101 may neither deactivate the mode or reset the threshold, instead placing responsibility for setting an allowable period of time on the debugger system or the user thereof.

As illustrated, three types of data may be inserted into trace data stream 140. Trace data 260 includes values associated with program execution recorded for a program trace mode. Data values 135 correspond to values written by instructions to trace register 130. Register values 254 are recorded when the architectural trace mode is active. Chart 200c depicts an example of the architectural trace mode enabled while the program trace mode is also enabled. Chart 200c illustrates how priorities may be managed between inserting trace data 260, data values 135, and register values 254 into trace data stream 140. At time t0, trace data 260a, followed by 260b is output to trace data stream 140 as part of the program trace mode.

The architectural trace mode is also active, and, at time t1, a time period elapses and values from trace register 130 and core registers 250 are to be output. Trace data 260 continues to be output and no idle cycle is available to output the two register values. In the present embodiment, a predetermined priority exists in which trace data 260 has a highest priority, followed by trace register data and then core register data. Accordingly, after timer value 244 reaches threshold 248b, trace data 260c is inserted into trace data stream 140 first, followed by data value 135a from trace register 130, and then register value 254b from core registers 250. In some embodiments, a different priority ranking may be used, including for example, a priority ranking set by the debugger system. In other embodiments, an arbitration algorithm may be used, taking into account various criteria from the values to be inserted and making a selection based on the criteria.

It is noted that the embodiment of FIG. 2 is one depiction for managing a trace data stream. Other embodiments, may include a different combination of circuit elements. For example, different timer circuits may be included for tracking the idle cycle wait time and for tracking the particular period of time in the architectural trace mode. Although only three core register values are shown for selection, in other embodiments, any suitable number of registers may be selected.

The systems illustrated in FIGS. 1 and 2 describe a program trace mode in which information related to the execution of instructions of a program is recorded and output in a trace data stream. The recorded information may be used to reconstruct a flow of the program. The information collected can create a large volume of data in the trace data stream, requiring a particular amount of time to record, insert and output the trace data stream, as well as making program flow reconstruction time consuming. A different trace mode is illustrated in FIG. 3 that may reduce times for producing the trace data stream and, subsequently, reconstructing the program flow.

Turning to FIG. 3, a block diagram of an embodiment of the processor circuit from FIG. 1 is shown. In addition, two charts are illustrated, the charts depicting respective flows of recorded information to a trace data stream. Processor circuit 100, as shown, includes debug circuit 101 and processor core 115a. Processor core 115a is shown with eight instructions, including instructions 352a, 352b, 352m, and 352t, as well as branch instructions 350a and 350b. Two more instructions, call instruction 354 and return instruction 356, are also included that may be indicative of an entry to, and an exit of, a subroutine. The eight instructions may be executed, in series, and retired into retire buffer 345. Charts 300a and 300b depict two examples of trace modes that may be supported by debug circuit 101.

As used herein, a "call" instruction refers to an instruction that is used to branch program flow to an identified subroutine. A "return" instruction, as used herein, refers to an instruction that is used at an end of a subroutine to return the program flow back to an instruction that immediately succeeds a call instruction that initiated the subroutine. A call instruction may cause at least a portion of core registers (e.g., a program counter) of a processor executing the call instruction to be placed onto the processor's stack. A corresponding return instruction may cause the portion of core registers, including the program counter, to be unstacked, thereby resulting in the processor core to execute the next instruction at the address indicated by the unstacked program counter (e.g., the instruction following the call instruction.

In chart 300a, a trace mode is depicted in which information related to the execution of various types of branch instructions are recorded and output in the trace data stream 140. As previously disclosed, recorded trace data may not include information on all executed instructions, but instead may be focused on branch instructions that directly impact a flow of a program. As shown, processor core 115a is executing a series of eight instructions of a particular software program, including instructions 352a, 352b, 352m, and 352t, as well as branch instructions 350a and 350b. Two more instructions, call instruction 354 and return instruction 356, are also included that are indicative of an entry to, and an exit of, a subroutine. In some embodiments, once execution of a given instructions has completed, the completed instruction may be placed into retire buffer 345. In other embodiments, the instructions may be kept in a different instruction buffer and an entry for a completed instruction is marked as retired.

Trace information for a given instruction may be recorded during or after the instruction's retirement. For example, branch instruction 350a is retired at time t0, resulting in placement in retire buffer 345 and generation of trace information for branch instruction 350a being output to trace data stream 140. At time t1, call instruction 354 is retired and trace information for call instruction 354 is output. At time t2, both branch instruction 350b and return instruction 356 are retired in a same processor clock cycle. Such an occurrence may happen when two instructions are executed closely together. In the illustrated case, branch instruction 350b may have caused execution of the particular program to skip instruction 352t and branch directly to return instruction 356, resulting in the two instructions being executed sequentially, one after another. Since branch instruction 350b was executed first, trace data for branch instruction 350b is output first after time t2 and then trace data for return instruction 356 is output to trace data stream 140 at time t3. A debugger system receiving trace data stream 140 may be capable of reconstructing the flow of the particular program with a high degree of accuracy.

In chart 300b, a low-bandwidth trace mode is depicted. This low-bandwidth trace mode, as shown, provides indications of a traced program entering and exiting program subroutines. In response to an activation of the low-bandwidth trace mode, debug circuit 101 may be configured to output, into trace data stream 140, information indicative of execution of call instruction 354 and return instruction 356 by processor core 115a, and ignore information indicative of other instructions executed by processor core 115a, including branch instructions 350a and 350b. Call instruction 354 may correspond to an entrance into a particular subroutine while return instruction 356 corresponds to a exit of the particular subroutine.

As shown at time t0, branch instruction 350a is retired, but debug circuit 101 is configured to omit trace data for branch instruction 350a from the trace data flow. At time t1, call instruction 354 is retired, and trace data is recorded and output to trace data stream 140. At time t2, only branch instruction 350b is retired, with no trace data output to trace data stream 140. In contrast to the trace mode operations shown in chart 300a, in response to the activation of the low-bandwidth trace mode, processor core 115a may be configured to retire a maximum of one branch instruction per processor clock cycle. Although, based on the operation of processor core 115a in chart 300a, return instruction 356 may be ready to retire at time t2, due to the activation of the low-bandwidth trace mode, retirement of return instruction 356 is delayed for a processor clock cycle to time t3, at which point, trace data related to the execution of return instruction 356 is output to trace data stream 140.

By limiting retirement of the various types of branch instructions to one per processor clock cycle, debug circuit 101 may be more capable of correctly identifying return instruction 356 as a return instruction and to accurately determine the target branch address for return instruction 356. In the operation depicted in chart 300a, it is possible that target branch addresses for branch instruction 350b and return instruction 356 may be confused by debug circuit 101. However, as long as both target addresses are captured in trace data stream 140, the debugger system may be capable of using other information in trace data stream 140 to decode which target address is related to which instruction. Since the low-bandwidth trace mode does not capture information for both instructions, delaying the retirement of return instruction 356 may result in a clear indication of its target address.

Call and return instruction may be indicative of points of entry into, and out of, respectively, subroutines of a program. By reducing trace information to such instructions, a complete reconstruction of a flow of a program may, in some situations, not be possible, but may provide enough detail for a user of the debugger system to gather desired information regarding the flow of the program and may, in some case, be performed faster than a standard trace mode.

It is noted that FIG. 3 is an example of tracing execution of branch instructions executed by a processor core. For clarity, tracing of a single processor core is shown. In other embodiments, instruction execution may be traced across multiple processor cores executing respective instructions concurrently.

FIG. 3 describes a low-bandwidth trace mode that records trace information for a subset of branching instructions. Due to the reduction in trace data generated by this low-bandwidth trace mode, the low-bandwidth trace mode may be used with other particular events. One such event is described in FIG. 4.

Proceeding to FIG. 4, a block diagram of an embodiment of the processor circuit from FIG. 1 is illustrated once again. A chart is shown that depicts a capture of information related to an exception event which is then output to a trace data stream. Processor circuit 100, as shown, includes debug circuit 101 and processor core 115a. Processor core 115a is shown executing a series of instructions, including call instruction 450a and instructions 452a and 452b, that are interrupted by exception 454.

As shown, processor core 115a, is executing a particular software program. At time t0, call instruction 450a is executed. Debug circuit 101, however, may not generate any trace information for the execution of this instruction as both a trace mode and a low-bandwidth trace mode may be disabled at time t0. Other debug features may, however, be active, such as an architectural trace mode, but no trace data may be recorded during this time. Processor circuit 100 continues executing instructions 452a and 452b.

At time t1, exception 454 occurs. Exception events may occur in processor circuit 100 for various reasons. In some cases, exceptions are expected to occur and may be a normal part of a program's execution. For example, exceptions may be used to indicate when input data has been generated by an input device such as a keyboard, a mouse, a touch screen, received by a network device, and the like. An exception may also be caused by events such as a timer circuit reaching a particular count value, an output of a sensor reaching a threshold level, and so forth. A program may expect some form of input to be received, or a circuit to indicate a particular status. Exceptions may provide indications to the processor that desired information is ready or a particular event has occurred without program code having to continuously or periodically poll a respective circuit to determine the status.

In some embodiments, an occurrence of exception 454 may cause debug circuit 101 to output, into trace data stream 140, information indicative of the occurrence of exception 454. For example, the occurrence of exception 454 may cause debug circuit 101 to activate the low-bandwidth trace mode. This may, in some embodiments, only occur if debug mode is enabled, but the low-bandwidth trace mode is otherwise inactive. In other embodiments, exceptions may only be traced when the trace mode or low-bandwidth trace mode is already active. Exception 454 may be treated in a manner similar to a call instruction as described in regards to FIG. 3, e.g., may be traced in both trace mode and low-bandwidth trace mode.

In some cases, an exception may be unexpected and may be indicative of improper operation of processor circuit 100. For example, an access to an illegal address (e.g., an address that is not implemented or that processor core 115a does not have authorization to access), or an attempt to execute an illegal instruction (e.g., an instruction opcode that is not implemented in an instruction set supported by processor core 115a) may cause unexpected exceptions. Such unexpected exceptions may be indicative of improper operation of processor circuit 100, and debug circuit 101 may be further configured to activate the low-bandwidth trace mode in response to an exception that is an indication of improper operation. For example, exception 454 may be an illegal address exception trigger if an address included in instruction 452b is not a valid address for processor core 115a. In response to exception 454, debug circuit 101 may activate the low-bandwidth trace mode in an attempt to capture some information about the improper operation. As with an expected exception, an unexpected exception may also be treated like a call instruction. Accordingly, return instruction 456, associated with exception 454 is retired at time t3, causing debug circuit 101 to record and output trace data for the return instruction 456. The low-bandwidth trace mode may remain active until deactivated by a debugger system coupled to processor circuit 100 deactivates the mode.

It is noted that FIG. 4 is merely an example for demonstrating the disclosed concepts. As with FIG. 3, only tracing of a single processor core is shown for clarity. Debug circuit 101 may be configured, in other embodiments, to trace instruction execution across a plurality of processor cores.

FIGS. 1-2 describe a trace register that may be written to by software instructions to annotate a trace data stream. Such a trace register may be implemented in a variety of manners. One such implementation is described in FIG. 5.

Figure 5:
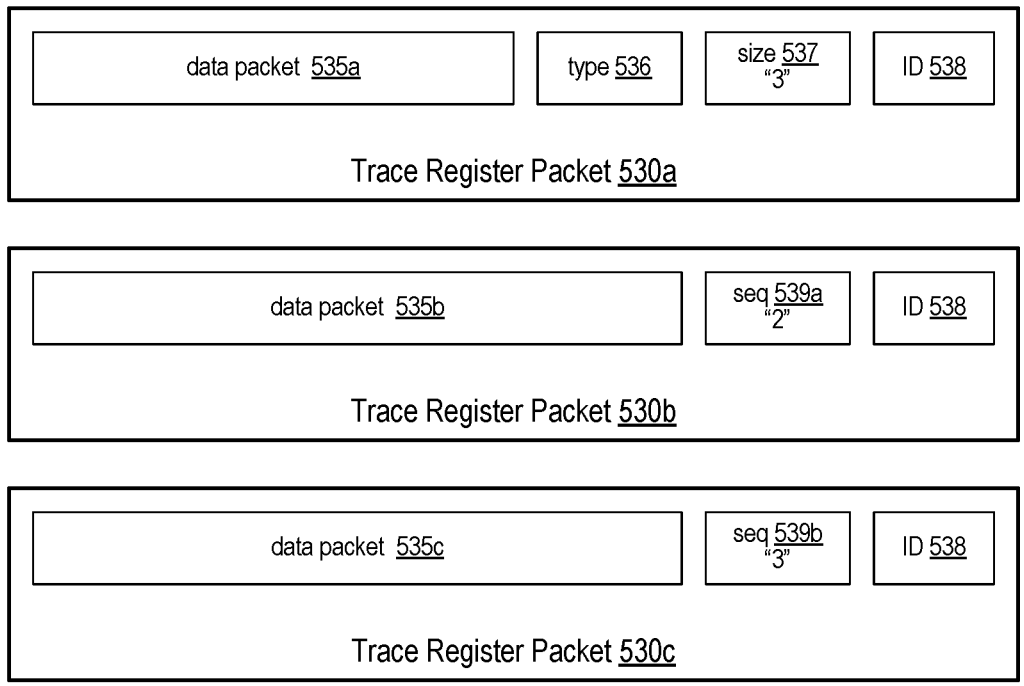
FIG. 5 shows an embodiment of information included in a trace register.

Moving now to FIG. 5, a block diagram of an embodiment of a trace data packet for annotating a trace data stream with trace register data is illustrated. Trace register packet 530 is shown with three portions, trace register packets 530a, 530b, and 530c. As previously disclosed, trace register 130 is architecturally visible to instructions being executed within any of processor cores 115. Trace register packets 530 include data that is written to a respective trace register 130 as well as additional trace information that may be added by debug circuit 101 for insertion into trace data stream 140. As shown, the three portions of trace register packet 530 each include a portion of data packet 535, e.g., data packet 535a, 535b, and 535c. Other information included in trace register packet 530 includes a type of packet (type) 536, a size of packet (size) 537, an identification value (ID) 538, and a sequence number (seq) 539a and 539b.

In various embodiments, trace register 130 may be implemented to receive a data value 135 with any suitable number of bits. Trace data included in trace data stream 140 may be inserted as individual trace packets, each entry having a particular number of bits. In some embodiments, trace register 130 may be configured to receive a data value with a number of bits that corresponds to a number of bits that can be included in one trace packet. In other embodiments, a given trace register 130 may be capable of receiving a data value that has more bits than can be included in one trace packet. The illustrated embodiment is an example of the latter. Accordingly, a write to trace register 130 may result in the three illustrated trace register packets 530.

Trace register packet 530a, as illustrated, is a first trace packet to be inserted of the three trace register packets 530. Data packet 535a includes a first portion of data value 135 written to trace register 130. Type 536 indicates what type of trace packet it is, in this case type 536 will have a value indicative of a trace register packet, distinguishable from other types of trace packets (e.g., program trace packets) that may be included in trace data stream 140. Size 537 indicates a number of trace packets included in trace register packet 530. In this example, size 537 is three for the three portions 530*a*-530*c*. ID 538 may be any suitable value that allows trace register packet 530 to be distinguished from other trace packets in trace data stream 140, including other trace register packets.

Trace register packets 530*b* and 530*c* are second and third packets of the indicated three trace register packets. Each includes a respective portion of data value 135 (e.g., data packet 535*b* and 535*c*), as well as a respective sequence number 539*a* and 539*b* to indicate the order for the three trace register packets 530. The ID 538 is also included so the three trace register packets 530 can be associated with one another, for example, by a debugger system receiving trace data stream 140.

It is noted that the values included in data packets 535*a*-535*c* correspond to data value 135 written to trace register 130. The other values may be generated by, for example, debug circuit 101. Debug circuit 101 may divide data value 135 into the respective portions of data packet 535, place each portion in a respective one of trace register packets 530, and then add the remaining information as needed to complete each portion of trace register packet 530.

It is also noted that FIG. 5 is merely an example of data from a trace register that may be captured and inserted into a trace data stream. Although the illustrated trace register packet is shown as being divided into three portions, in other embodiments, trace register packet may be divided into any suitable number of portions. In some embodiments, a size of trace register 130 may correspond to a size of a single trace packet such that trace register packet 530 does not require dividing.

The circuits and techniques described above in regards to FIGS. 1-5 may be performed using a variety of methods. Three methods associated with operation of a trace register and a trace data stream are described below in regards to FIGS. 6-8.

Proceeding to FIG. 6, a flow diagram for an embodiment of a method for anointing a trace data stream with a data value written by a program instruction executed by a processor core is shown. Method 600 may be performed by, for example, debug circuit 101 in FIGS. 1-4. Referring collectively to FIGS. 1 and 6, method 600 begins in block 610.

At block 610, method 600 includes, in response to an activation of a trace mode to record information associated with traced program 118 executing on processor core 115*a*, generating, by debug circuit 101, trace data stream 140 that includes trace data collected on traced program 118. As illustrated, trace data stream 140 may include trace data collected on instructions executing on processor core 115*a* for traced program 118. For example, a debugger circuit may be coupled to processor circuit 100, that may cause an activation of a debug mode signal (e.g., in debug circuit 101) that causes processor circuit 100 to enter the trace mode. While this trace mode is active, debug circuit 101 may be configured to observe one or more of processor cores 115 to detect execution of instructions of traced program 118. In some embodiments, the debugger system may determine which ones of processor cores 115 to monitor. In other embodiments, debug circuit 101 may be configured to determine which ones of processor cores 115 are executing instructions corresponding to traced program 118.

Method 600 further includes, at block 620, executing, by processor core 115*b*, instruction 116 in the program that specifies a write of data value 135 to an architecturally visible trace register 130 in debug circuit 101. In some embodiments, processor core 115*b* may be one of the processor cores 115 that are being monitored by debug circuit 101. In other embodiments, processor core 115*b* may be executing instructions for a different program than traced program 118, such as a kernel process of an operating system, or other background process being executed concurrently with traced program 118. Processor core 115*b* may be configured to execute instruction 116 in response to a particular event in processor circuit 100, such as, processor core 115*a* reaching a certain instruction in traced program 118, or a particular action performed by a different circuit coupled to processor circuit 100 (not shown), e.g., a network interface receiving a packet.

At block 630, method 600 also includes annotating, by debug circuit 101, trace data stream 140 with data value 135 from trace register 130 as part of executing instruction 116. Debug circuit 101 may generate a trace register packet, such as trace register packet 530 in FIG. 5, that includes data value 135 as well as other information. The method may include waiting, by debug circuit 101, for an idle cycle in trace data stream 140 to insert trace register packet 530, including data value 135. In response to determining that a threshold amount of time has elapsed without an idle cycle having occurred, debug circuit 101 may stall traced program 118 executing on processor core 115*a*, and then insert trace register packet 530 into trace data stream 140 after an idle cycle occurs during the stalling.

Method 600 may end in block 630 or, in some embodiments, some or all operations of method 600 may be repeated. For example, method 600 may repeat blocks 620 and 630 in response to another write to trace register 130. It is noted that the method of FIG. 6 is merely an example for annotating a trace data stream.

Moving now to FIG. 7, a flow diagram for an embodiment of a method for performing a register trace mode is illustrated. In a similar manner as method 600, method 700 may be performed by a debug circuit, such as debug circuit 101 in FIGS. 1-4. Operations included in method 700 may be performed in conjunction with particular operations in method 600. Referring collectively to FIGS. 1, 2, and 7, method 700 begins in block 710.

Method 700 at block 710, includes, activating a register trace mode to record values of a particular set of core registers 250. The register trace mode, as shown, includes recording, by debug circuit 101, the register values after a particular period of time has elapsed since a previous recording. The method includes determining, by debug circuit 101, the particular period of time using programmable timer 240. For example, a debugger system (not shown) coupled to processor circuit 100 may set threshold 248 to a value that corresponds to the particular period of time. In other embodiments, program instructions executed by one of processor cores 115 may set threshold 248. In some embodiments, in response to determining that the particular period of time is less than a particular minimum allowable amount of time, the register trace mode may be deactivated by debug circuit 101. In other embodiments, a value of threshold 248 may be modified to correspond to the minimum amount of time.

At block 720, method 700 includes, determining, by debug circuit 101, the particular set of core registers 250 using a value of programmable selector register 270. The debugger system or one of processor cores 115 may write to selector register 270 to indicate which ones of core registers 250 are included in the set to be recorded. In some embodiments, trace register 130 may also be selectable in selector register 270. In other embodiments, trace register 130 may be included in the set of core registers by default.

At block 730, method 700 also includes, in response to determining that the particular period of time has elapsed, stalling, by debug circuit 101, traced program 118 executing on processor core 115*a*. If a trace mode is also active while the register trace mode is active, then the trace mode may cause trace data 260 (recorded from execution of traced program 118) to be included in trace data stream 140, as shown in chart 200*c*. If enough idle cycles are not available to insert all register trace data (e.g., data value 135*a* and register value 254*b*) into trace data stream 140, then debug circuit 101 activates a stalling mechanism that causes processor core 115*a* to pause execution of instructions of traced program 118.

Method 700 includes, at block 740, annotating, by debug circuit 101, trace data stream 140 with data value 135*a* from trace register 130 and register value 254*b* from the particular set of core registers 250 by inserting the respective data values into trace data stream 140 during the stalling. As described above, debug circuit 101 may employ a default priority or use an arbitration algorithm to select an order among trace data 260*c*, data value 135*a* and register value 254*b* for annotating trace data stream 140. The stalling may allow processor core 115*a* to complete an in-progress instruction in traced program 118 to complete, which may result in trace data 260*c* being recorded. The three values to be annotated into trace data stream 140, trace data 260*c*, data value 135*a* and register value 254*b*, are prioritized and may then be inserted into trace data stream 140 after an idle cycle has become available.

In some embodiments, method 700 may end in block 740, or in other embodiments, may repeat some or all operations. For example, method 700 may repeat blocks 730 and 740 at subsequent elapses of the particular time period.

Turning now to FIG. 8, a flow diagram for an embodiment of a method for performing a low-bandwidth trace mode is shown. Similar to methods 600 and 700, method 800 may be performed by a debug circuit, such as debug circuit 101 in FIGS. 1-4. Operations included in method 800 may be performed in conjunction with some or all of operations in methods 600 and 700. Referring collectively to FIGS. 3 and 8, method 800 begins in block 810.

Method 800 at block 810, includes, in response to an activation of a low-bandwidth trace mode, retiring, by processor core 115*a*, a maximum of one branch instruction per clock cycle. Activation of the low-bandwidth trace mode may be performed by a debugger system coupled to processor circuit 100, one of processor cores 115 executing an operating system kernel or other background process, or in response to an indication of improper operation of processor core 115*a* or other circuits in processor circuit 100. The low-bandwidth trace mode may be enabled for any suitable combination of processor cores 115. If the low-bandwidth trace mode is enabled due to an indication of improper operation, then only processor cores associated with the indication may be included, or in other embodiments, all processor cores 115 may be included.

In the low-bandwidth trace mode, traced processor cores, e.g., processor core 115*a* in the present example, are configured to retire a single branch instruction in a given processor cycle. This may avoid a potential for confusion between target addresses when, as shown in FIG. 3, branch instruction 350*b* and return instruction 356 are retired in a same cycle. Since only return instruction 356 is traced, it may be desirable to associate the correct target address with return instruction 356. In a standard-bandwidth trace mode, execution of both instructions is recorded, so information regarding both target addresses may be captured, and the flow of traced program 118 may be accurately reconstructed.

At block 820, method 800 includes outputting, into trace data stream 140, information indicative of execution of call instruction 354 and return instruction 356 by processor core 115*a*, and ignoring information indicative of other instructions executed by processor core 115*a*. As previously disclosed, a given pair of call and return instructions may be indicative of entrance to, and exit from, a respective program subroutine. In the low-bandwidth trace mode, trace data stream may be limited to information related to entrance and exit of various subroutines of traced program 118. Other types of program flow information, such as loops and conditional branches, may be ignored. Such a reduced set of program flow information may be sufficient, in some cases, for a developer to identify a particular bug or other program flow of interest. A developer may use the low-bandwidth trace mode as an initial debugging step, and then switch to, for example, a standard-bandwidth trace mode in which all branch instruction execution is recorded.

At block 830, method 800 also includes, output, into trace data stream 140, information indicative of an occurrence of exception 454. As shown in FIG. 4, an occurrence of exception 454 may be treated in a manner similar to call instruction 354 in FIG. 3. Accordingly, exceptions may be recorded similar to call instructions. An exception may behave in a similar manner as a call to a subroutine. For example, an exception due to a mouse click may cause processor core 115*a* to execute an exception routine that determines a location of a mouse pointer at the time of the click. Once the location information has been determined, the exception routine may return traced program 118 back to a next instruction that would have been executed if the exception had not occurred. The low-bandwidth trace mode, therefore, may capture information regarding execution of subroutines as well as exception routines.

Operation of method 800 may end in block 830, or some or all operations may be repeated. For example, method 800 may repeat all blocks while the low-bandwidth trace mode is active. Blocks 810-830 may be performed in an order different that shown in FIG. 8. For example, performance of blocks 820 and 830 may happen whenever a call or return instruction is executed or an exception occurs. Performance of various operations of methods 600, 700, and 800 may be performed concurrently. For example, all three methods may be performed concurrently with low-bandwidth trace mode and register trace mode both active when a write to trace register 130 occurs.

Figure 9:
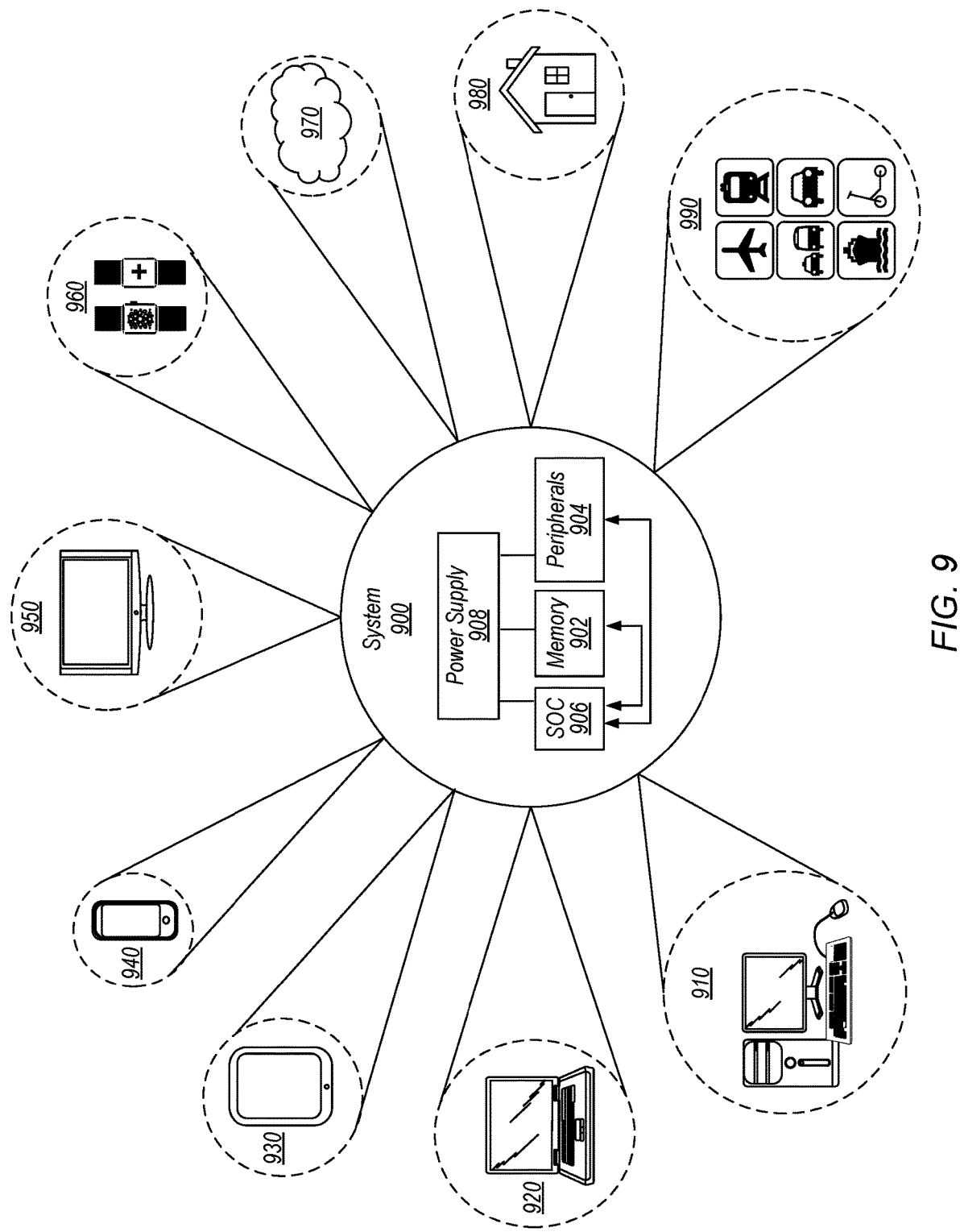
FIG. 9 depicts various embodiments of systems that include coupled integrated circuits.

FIGS. 1-8 illustrate circuits and methods for a processor circuit that includes a debug circuit for performing various trace operations in the processor circuit. Any embodiment of the disclosed processor circuits may be included in one or more of a variety of computer systems, such as a desktop computer, laptop computer, smartphone, tablet, wearable device, and the like. In some embodiments, the circuits described above may be implemented on a system-on-chip (SoC) or other type of integrated circuit. A block diagram illustrating an embodiment of computer system 900 is illustrated in FIG. 9. Computer system 900 may, in some embodiments, include any disclosed embodiment of processor circuit 100.

In the illustrated embodiment, the system 900 includes at least one instance of a system on chip (SoC) 906 which may include multiple types of processing circuits, such as a central processing unit (CPU), a graphics processing unit (GPU), or otherwise, a communication fabric, and interfaces to memories and input/output devices. One or more of these processing circuits may correspond to an instance of processor circuit 100. In some embodiments, one or more processors in SoC 906 includes multiple execution lanes and an instruction issue queue. In various embodiments, SoC 906 is coupled to external memory 902, peripherals 904, and power supply 908.

A power supply 908 is also provided which supplies the supply voltages to SoC 906 as well as one or more supply voltages to the memory 902 and/or the peripherals 904. In various embodiments, power supply 908 represents a battery (e.g., a rechargeable battery in a smart phone, laptop or tablet computer, or other device). In some embodiments, more than one instance of SoC 906 is included (and more than one external memory 902 is included as well).

The memory 902 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 904 include any desired circuitry, depending on the type of system 900. For example, in one embodiment, peripherals 904 includes devices for various types of wireless communication, such as Wi-Fi, Bluetooth, cellular, global positioning system, etc. In some embodiments, the peripherals 904 also include additional storage, including RAM storage, solid state storage, or disk storage. The peripherals 904 include user interface devices such as a display screen, including touch display screens or multi-touch display screens, keyboard or other input devices, microphones, speakers, etc.

As illustrated, system 900 is shown to have application in a wide range of areas. For example, system 900 may be utilized as part of the chips, circuitry, components, etc., of a desktop computer 910, laptop computer 920, tablet computer 930, cellular or mobile phone 940, or television 950 (or set-top box coupled to a television). Also illustrated is a smartwatch and health monitoring device 960. In some embodiments, the smartwatch may include a variety of general-purpose computing related functions. For example, the smartwatch may provide access to email, cellphone service, a user calendar, and so on. In various embodiments, a health monitoring device may be a dedicated medical device or otherwise include dedicated health related functionality. In various embodiments, the above-mentioned smartwatch may or may not include some or any health monitoring related functions. Other wearable devices 960 are contemplated as well, such as devices worn around the neck, devices attached to hats or other headgear, devices that are implantable in the human body, eyeglasses designed to provide an augmented and/or virtual reality experience, and so on.

System 900 may further be used as part of a cloud-based service(s) 970. For example, the previously mentioned devices, and/or other devices, may access computing resources in the cloud (i.e., remotely located hardware and/or software resources). Still further, system 900 may be utilized in one or more devices of a home 980 other than those previously mentioned. For example, appliances within the home may monitor and detect conditions that warrant attention. Various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 9 is the application of system 900 to various modes of transportation 990. For example, system 900 may be used in the control and/or entertainment systems of aircraft, trains, buses, cars for hire, private automobiles, waterborne vessels from private boats to cruise liners, scooters (for rent or owned), and so on. In various cases, system 900 may be used to provide automated guidance (e.g., self-driving vehicles), general systems control, and otherwise.

It is noted that the wide variety of potential applications for system 900 may include a variety of performance, cost, and power consumption requirements. Accordingly, a scalable solution enabling use of one or more integrated circuits to provide a suitable combination of performance, cost, and power consumption may be beneficial. These and many other embodiments are possible and are contemplated. It is noted that the devices and applications illustrated in FIG. 9 are illustrative only and are not intended to be limiting. Other devices are possible and are contemplated.

As disclosed in regards to FIG. 9, computer system 900 may include one or more integrated circuits included within a personal computer, smart phone, tablet computer, or other type of computing device. A process for designing and producing an integrated circuit using design information is presented below in FIG. 10.

Figure 10:
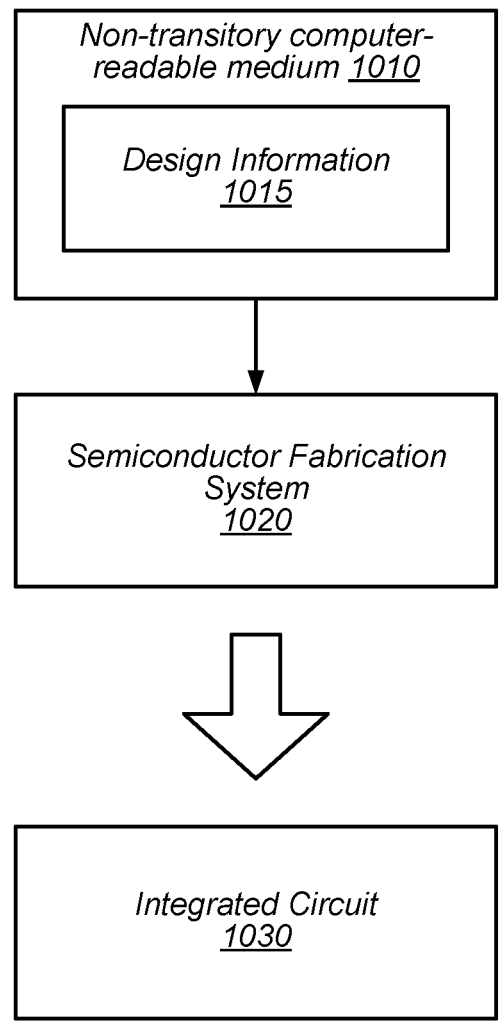
FIG. 10 illustrates a block diagram of an example computer-readable medium, according to some embodiments.

FIG. 10 is a block diagram illustrating an example of a non-transitory computer-readable storage medium that stores circuit design information, according to some embodiments. The embodiment of FIG. 10 may be utilized in a process to design and manufacture integrated circuits, for example, systems including one or more instances of processor circuit 100 as shown in FIGS. 1-4. In the illustrated embodiment, semiconductor fabrication system 1020 is configured to process the design information 1015 stored on non-transitory computer-readable storage medium 1010 and fabricate integrated circuit 1030 based on the design information 1015.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hardware description languages such as, without limitation:

VHDL, Verilog, SystemC, System Verilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system, such as semiconductor fabrication system 1020, for example. In some embodiments, design information 1015 may include a netlist that specifies elements of a cell library, as well as their connectivity. One or more cell libraries used during logic synthesis of circuits included in integrated circuit 1030 may also be included in design information 1015. Such cell libraries may include information indicative of device or transistor level netlists, mask design data, characterization data, and the like, of cells included in the cell library.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (gdsii), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown or described herein. Further, integrated circuit 1030 may be configured to perform various functions described herein in conjunction with other components.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   a processor circuit comprising:
      a memory circuit;
      one or more processor cores; and
      a debug circuit that includes an architecturally visible trace register that is accessible by at least a particular one of the one or more processor cores, the debug circuit configured, in response to activation of a trace mode to;
         observe and record trace data indicative of instructions executing on the one or more processor cores; and
         write a trace data stream to the memory circuit that includes the recorded trace data;
   wherein the particular processor core is configured to:
      in response to execution of a particular instruction, write a data value indicated by the particular instruction to the architecturally visible trace register; and
   wherein the debug circuit is further configured to:
      annotate, as part of executing the particular instruction, the trace data stream with an insertion of the data value into the trace data stream.

2. The apparatus of claim 1, wherein the debug circuit is further configured to:
   based on the write to the trace register, initiate a timer;
   attempt to locate an idle cycle in the trace data stream to insert the data value from the trace register; and
   in response to a determination that the timer has reached a threshold value and the idle cycle has not occurred:
      stall the instructions executing on the one or more processor cores; and
      insert the data value from the trace register into the trace data stream.

3. The apparatus of claim 1, wherein the debug circuit is further configured to output a current data value of the trace register in response to a determination that a particular period of time has elapsed since a previous output of the data value.

4. The apparatus of claim 3, wherein the debug circuit is further configured to output respective current data values of particular core registers with the current data value of the trace register.

5. The apparatus of claim 4, wherein the debug circuit is further configured to cease output of the trace data recorded from the instructions executing on the one or more processor cores while maintaining periodic output of current data values of the trace register and the particular core registers.

6. The apparatus of claim 1, wherein the debug circuit is further configured to:
   output trace data corresponding to call instructions and return instructions executed by the one or more processor cores; and
   omit trace data corresponding to other instructions executed by the one or more processor cores.

7. The apparatus of claim 1, wherein the particular processor core is further configured to write the data value to the trace register in a single cycle of a system clock signal.

8. A method, comprising:
- in response to an activation of a trace mode to record information associated with a program executing on a processor core, generating, by a debug circuit, a trace data stream that includes trace data collected on the executing program;
- executing, by the processor core, a particular instruction in the program that specifies a write of a data value to an architecturally visible trace register in the debug circuit;
- waiting, by the processor core, for an idle cycle in the trace data stream to insert the data value; and
- annotating, by the debug circuit as part of executing the particular instruction, the idle cycle in the trace data stream with the data value from the trace register.

9. The method of claim 8, wherein annotating the trace data stream includes:
- in response to determining that a threshold amount of time has elapsed without the idle cycle, generating, by the debug circuit, the idle cycle by stalling the program executing on the processor core.

10. The method of claim 8, further comprising, in response to an activation of a register trace mode to record values of a particular set of core registers, annotating, by the debug circuit, the trace data stream with respective data values from the particular set of core registers in response to determining that a particular period of time has elapsed since a previous annotating.

11. The method of claim 10, further comprising determining, by the debug circuit, the particular set of core registers using a value of a programmable selector register.

12. The method of claim 10, further comprising:
- determining, by the debug circuit, the particular period of time using a programmable timer; and
- in response to determining that the particular period of time is less than a threshold amount of time, deactivating the register trace mode.

13. The method of claim 10, wherein annotating the trace data stream includes:
- stalling, by the debug circuit in response to the particular period of time elapsing, the program executing on the processor core; and
- inserting, by the debug circuit, the respective data values from the particular set of core registers into the trace data stream during the stalling.

14. The method of claim 10, wherein the trace register is included in the particular set of core registers.

15. A system, comprising:
- a memory circuit;
- a processor circuit including one or more processor cores and a debug circuit with a trace register, wherein the processor circuit is configured, to:
  - in response to activation of a mode to record trace data indicative of instruction execution by the one or more processor cores, use the debug circuit to stream the trace data to the memory circuit;
  - based on a determination that a particular period of time has elapsed since a previous output of a current data value stored in the trace register, use the debug circuit to insert the current data value of the trace register into the trace data stream;
  - in response to execution of a particular instruction by a given one of the one or more processor cores, use the given processor core to write a data value indicated by the particular instruction to the trace register without altering an architectural state of the one or more processor cores, wherein the trace register is directly addressable by the given processor core; and
  - in response to a determination that the data value has been written to the trace register, use the debug circuit to insert the data value from the trace register into the trace data stream.

16. The system of claim 15, wherein the processor circuit is further configured to use the debug circuit to:
- attempt to locate an idle cycle in the trace data stream to insert the data value from the trace register; and
- in response to a determination that a threshold amount of time has elapsed without an idle cycle:
  - stall instructions executing on the one or more processor cores; and
  - insert the data value from the trace register into the trace data stream.

17. The system of claim 15, wherein the processor circuit is further configured, in response to activation of a different mode, to use the debug circuit to:
- output, into the trace data stream, information indicative of execution of call instructions and return instructions by the one or more processor cores; and
- ignore information indicative of other instructions executed by the one or more processor cores.

18. The system of claim 17, wherein the processor circuit is further configured, in response to the activation of the different mode, to cause the processor cores to retire a maximum of one branch instruction per clock cycle.

19. The system of claim 17, wherein the processor circuit is further configured to activate the different mode in response to an indication of improper operation.

20. The system of claim 17, wherein the processor circuit is further configured, in response to the activation of the different mode, to cause the debug circuit to output, into the trace data stream, information indicative of an occurrence of an exception.

* * * * *